United States Patent [19]

Star

[11] 4,425,978

[45] Jan. 17, 1984

[54] MOBILE HOSPITAL UNIT

[76] Inventor: Leon D. Star, Building #198, Kennedy International Airport, Jamaica, N.Y. 11430

[21] Appl. No.: 302,171

[22] Filed: Sep. 14, 1981

[51] Int. Cl.³ .............................................. B62D 47/00
[52] U.S. Cl. .................................... 180/243; 180/41; 180/245; 280/6 R; 280/6 H; 280/6.1; 296/19; 296/156
[58] Field of Search ................. 180/41, 308, 243, 245, 180/246; 244/118; 280/6 R, 6 H, 6.1, 43.23; 296/19, 156; 220/1 V, 1.5; 294/81 SF

[56] References Cited

U.S. PATENT DOCUMENTS

| 2,636,746 | 4/1953 | Meldrum | 280/6 H |
| 3,183,016 | 5/1965 | Gustafsson | 280/6.1 |
| 3,254,738 | 6/1966 | Larsen | 180/9.1 |
| 3,386,747 | 6/1968 | Watt, Jr. | 280/6 R |
| 3,441,101 | 4/1969 | Parnell | 296/156 |
| 3,584,698 | 6/1971 | Larson et al. | 180/308 |
| 3,669,290 | 6/1972 | Doyle | 294/81 SF |
| 3,743,044 | 7/1973 | Scheele | 180/24 |
| 4,180,138 | 12/1979 | Shea | 180/245 |
| 4,181,347 | 1/1980 | Clark | 296/19 |
| 4,231,709 | 11/1980 | Corsetti | 280/43.23 |
| 4,321,977 | 3/1982 | Tenn | 180/12 |

FOREIGN PATENT DOCUMENTS 610254 4/1979 Switzerland .................. 296/19

OTHER PUBLICATIONS

*Interavia*, Nov. 1961, C. Fischer, "The Crane Helicopter", pp. 1510–1513.

*Primary Examiner*—Joseph F. Peters, Jr.
*Assistant Examiner*—Kenneth R. Rice
*Attorney, Agent, or Firm*—Bauer & Amer

[57] ABSTRACT

A standard cargo container is reconstructed into a readily transportable hospital unit for providing emergency treatment to injured survivors at a site of a major disaster, wherein the structural features embodied by the container contribute to its transportability to the disaster site (except, of course, instead of cargo, the container houses medical facilities and supplies), and subsequently at the site the container has surface transportability as a result of internal combustion engine-operated front wheels and hydraulically-operated rear wheels. The rear wheels also have the noteworthy operating mode of being extendable and retractable so as to maintain a horizontal orientation in the container during the loading and unloading thereof from a cargo-type aircraft.

4 Claims, 4 Drawing Figures

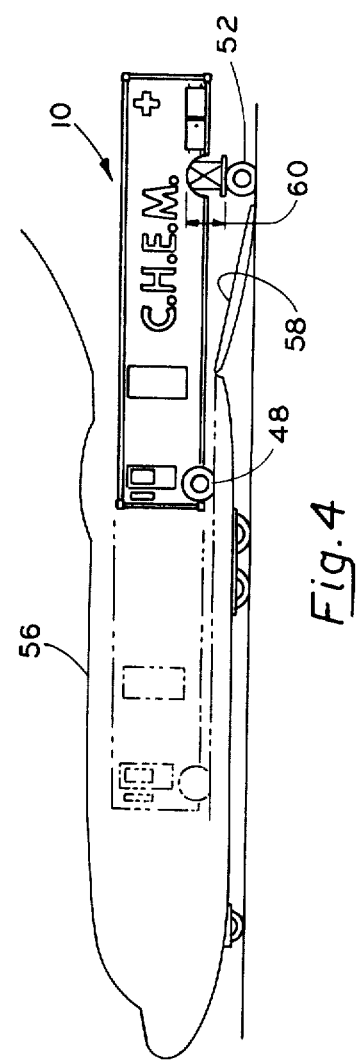
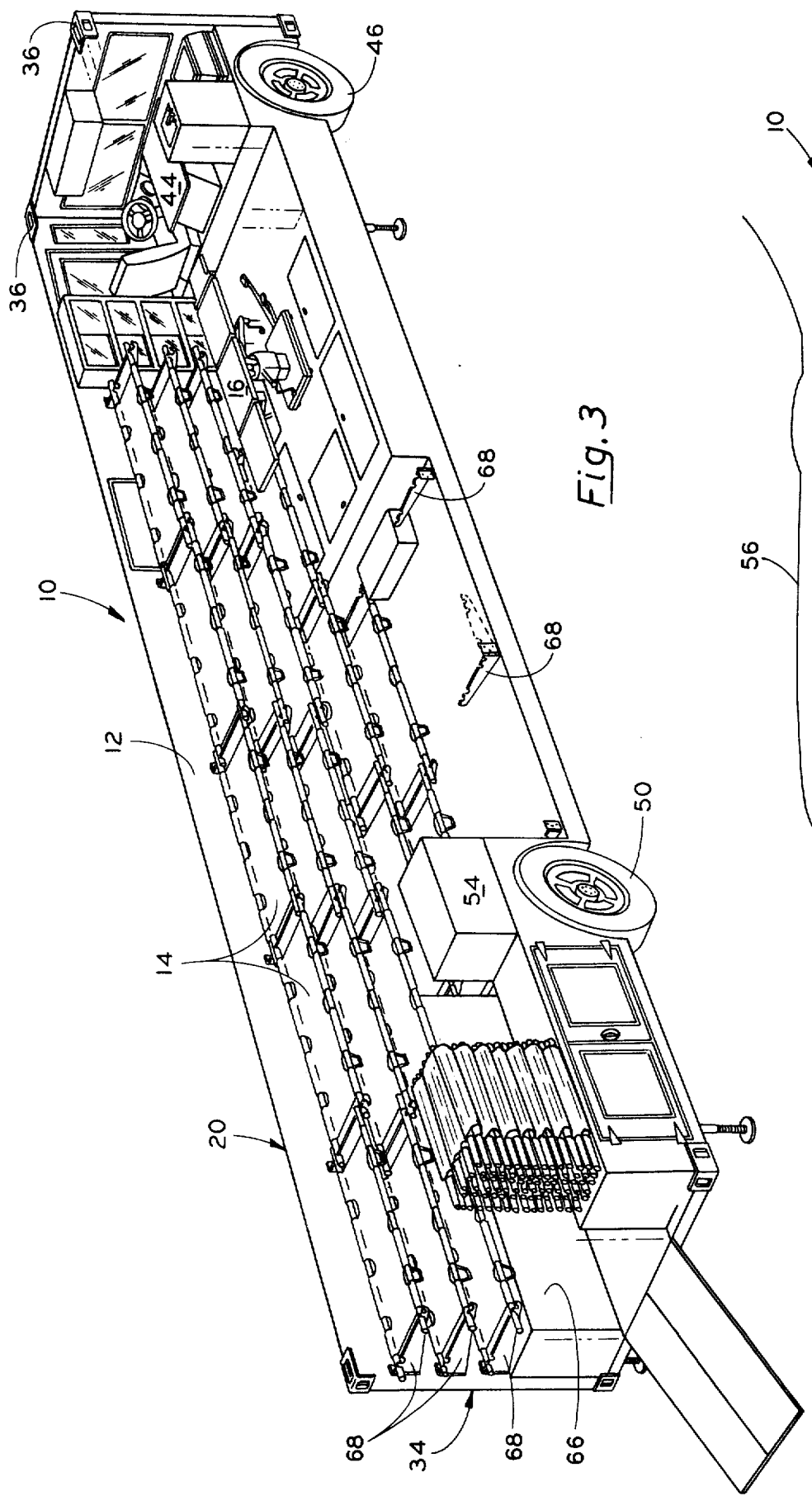
Fig. 3
Fig. 4

MOBILE HOSPITAL UNIT

The present invention relates generally to a hospital unit for use in providing emergency medical treatment at the actual scene or site of a major disaster, and more particularly to structural features embodied by the within hospital unit which contribute to its transportability by airlift or the like to the disaster site, and its surface transportability or mobility at the site.

It is known that major accidents, such as the crashing of large passenger aircraft at or near airports, as well as earthquakes and other such natural disasters, are survivable if modern emergency treatment for injured survivors can be effectively provided. The emergency treatment, moreover, must be administered at the disaster site, since for any one or more reasons the injured survivors usually cannot be removed from the disaster site to a hospital preparatory to receiving such treatment. In the case of an air crash for example, there might be literally hundreds of survivors of widely varying injuries and not nearly enough emergency vehicles available to transport these casualties, even assuming the most favorable road conditions for the operation of such vehicles.

Underlying the present invention is the recognition, therefore, that the necessary medical equipment and personnel for providing emergency medical treatment must in the first instance be transported to the disaster site, since otherwise it cannot be realistically expected that these survivors can be removed to a remotely located hospital to receive the care that is necessary. To implement this, there is herein proposed a readily transportable structure, adapted without mishap to be airlifted or otherwise taken to the disaster site, and further adapted at the site to be mobile or have surface transportability to correspondingly further enhance its use as a medical-dispensing unit to the injured survivors thereat. The transportability as just described is furthermore achieved at nominal sacrifice in the size of the structure, in that it is large enough to adequately house considerable medical equipment and supplies, all as is explained in detail subsequently herein.

A hospital unit, adapted to be transported by airlift as well as having surface mobility, demonstrating objects and advantages of the present invention includes a body formed of a standard cargo container of the type capable of airlift transportation so that it also can be airlifted to a selected location in the immediate vicinity of a disaster site. Such container is also adequately sized to bound an internal area of approximately eight feet in width, eight feet in height and forty feet in length and has been found in practice to provide enough room for storage of medical equipment and facilates for the purposes intended. A four-wheel drive is operatively embodied in the aforesaid container and is adapted to provide surface transportability thereto for movement of the container from any disaster site selected location to the injured survivors thereat. According to the present invention, the referred to four-wheel drive consists of an internal combustion engine-operated pair of front wheels and, in the rear and on each of the opposite sides of the container a wheel is operatively associated with a cooperating hydraulic motor such that said wheel is selectively independently adapted to be powered in rotation and also be urged through movement to selected clearance positions from the container incident to maintaining a horizontal orientation in the container.

The result of rotation of the rear wheels in conjunction with the front wheels renders the container mobile at the disaster site, while the clearing positions that can be provided the rear wheels facilitates the transportation handling thereof in that it eliminates any problems in the ability of the container to ascend or descend a loading ramp of a cargo aircraft without causing displacement of the contents or personnel therein.

The above brief description, as well as further objects, features and advantages of the present invention, will be more fully appreciated by reference to the following detailed description of a presently preferred, but nonetheless illustrative embodiment in accordance with the present invention, when taken in conjuntion with the accompanying drawings, wherein:

FIG. 3 is another perspective view of the unit, again with external wall portions thereof removed to better illustrate internal structural features thereof; and FIG. 4 is a side elevational view illustrating the loading of the unit on a cargo aircraft to achieve airlift transportability thereof.

Figure 1:
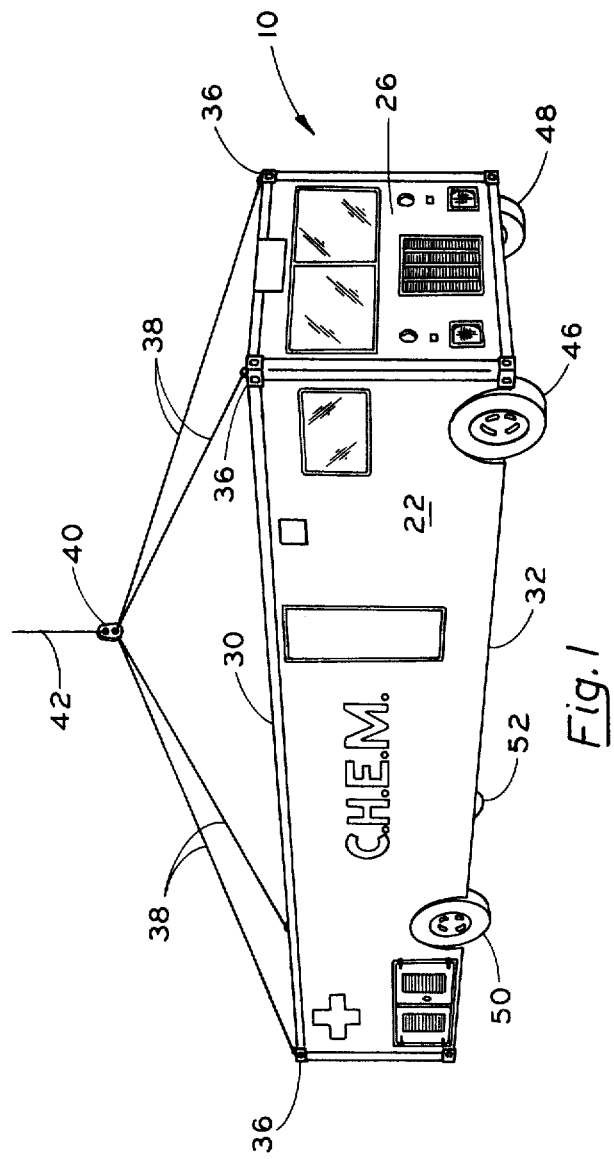
FIG. 1 is a perspective view of an emergency medical unit having surface transportability and otherwise demonstrating objects and advantages of the present invention.

The emergency hospital unit according to the present invention, generally designated 10, is intended to solve problems resulting from major accidents, such as the crashing of large passenger aircraft on or near airports, as well as problems associated with natural disasters such as earthquakes, flood and tornados. Underlying the present invention is the recognition that the referred to disasters are survivable if modern emergency care for injured survivors can be effectively provided. This in turn requires that equipment necessary for getting comprehensive, sophisticated medical care, and trained personnel, from physicians down to litter-bearers, be provided at the disaster site. More simply put, it is a fundamental concept underlying the present invention the proper medical equipment and personnel must be transported to the disaster site since it cannot be realistically expected that the injured survivors can be transported to a hospital in order to receive emergency treatment, which should be provided as promptly as possible following the accident. Rather, such emergency treatment must be provided at the disaster site for any one of several reasons that are the practical result of a major disaster. For example, most hospitals in a metropolitan area are usually full, and or at least can be expected to be full, at the time of a disaster. Also, road conditions generally are not favorable after a disaster due to possibly weather conditions, normal heavy traffic, or even the morbid curiosity of those interested in witnessing an unpleasant event. Still further, the number of emergency vehicles available at any given time is usually not sufficient to transport several hundred casualties immediately to hospitals and in a modern aircraft, such as a DC-10, there may be as many as 370 passengers, which could result in literally hundreds of survivors of widely varying injuries as a result of a major disaster. For the foregoing and other reasons, it is, therefore, necessary that there be available for transit to the site of a major disaster of the appropriate emergency medical unit, such as unit 10 thereof.

While the structural details of unit 10 will, of course, be explained in detail subsequently, it is helpful at this point to note generally the attributes of a preferred commercial embodiment. More particularly, a unit 10 demonstrating objects and advantages of the present invention is a modification of a standard sea cargo container which, as is generally known, is usually 8 feet in width, 8.5 feet in height and 40 feet long. This external size in practice provides an adequately sized internal area 12 for storage of necessary medical equipment and facilities such as stretcher beds 14, preferrably twenty four in number, an oxygen supply (not shown), and an operating table 16, to mention just a few of the important items of medical equipment which, of course, will be understood to be only exemplary of the type of medical equipment and facilities that must be on hand and available in the unit 10 for use in providing emergency treatment to injured survivors of a major disaster. In addition, it will be understood that a commercial embodiment of the unit 10 will have a self-contained generator (not shown) capable of providing electrical power, heat and air conditioning. What will now be described in detail are the attributes of the unit 10 which render it self-transportable on surface roads, as well as being capable of being airlifted by a C-130 cargo plane. Also, since unit 10 is a converted standard sea cargo container, it will, of course, also be understood that it can be transported by sea or rail.

As has been just noted, the mobile unit 10 is comprised basicly of a standard cargo container, generally designated 20 and as such, in rectangularly shaped, and has opposite side walls 22 and 24, and opposite end walls 26 and 28, and a ceiling and bottom 30, 32 bounding the previously noted area 12 that is used to provide emergency hospital services. As understood, an essential aspect in the construction of a cargo container, and thus a structural feature embodied by the container 20 hereof, is an interconnected metal frame, best illustrated and designated generally by the reference numeral 34 in FIG. 3. Frame 34 includes lifting plates, individually and collectively designated 36, at each of the upper four corners thereof which, in a well understood manner, are adapted, as illustrated in FIG. 1, of being used for completing connections with cables 38 and in turn are connected, as at 40, to a main cable 42 of a helicopter or the like. As a result, the hospital unit 10 is capable of being airlifted by helicopter to the immediate vicinity of a disaster site, as well as being expeditiously handled, again as illustrated in FIG. 1, by an overhead crane or the like, incident to be loaded or unloaded for seal or rail transportation.

In summary, therefore, an essential aspect underlying the present invention is the advantageous use of a standard cargo container, herein generally designated 20, which has the just noted structural features 34, 36, to advantageously permit the transportation of the hospital unit 10 to the immediate vicinity of a major disaster. Such transportation, however, is not deemed sufficient for the use of the hospital unit 10 for emergency treatment, it also being necessary, and thus is another essential aspect underlying the present invention, that the unit 10 be self-transportable on surface roads, as well as being capable of being airlifted in cargo aircraft, such as a C-130. To this end, the hospital unit 10 is provided adjacent its front end, and in an appropriately delineated area, with an internal combustion engine 44 of well understood construction and operational mode in which it powers in rotation a pair of front wheels 46 and 48.

Cooperating with said internal combustion engine-operated front wheels 46, 48 are rear wheels 50 and 52 which, according to as essential aspect of the within invention, are completely independent of the front wheels 46 and 48 insofar as the internal combustion engine 44 is concerned. That is, unlike the operative arrangement in a traditional vehicle, there is no drive connection between the internal combustion engine 44 and the rear wheels 50 and 52. Instead, each of the rear wheels 50 and 52 is independently operated in that each has its own cooperating hydraulic motor 54 (only one of which is shown in FIG. 3). That is, each of the rear wheels 50 and 52 has its own cooperating hydraulic motor 54 operatively connected to it to both power each wheel in rotation and also to urge each wheel to a selected clearance position, of a descending nature from the container 20, so as to maintain a horizontal orientation in the container 20 during the loading and unloading of said container with respect to a cargo aircraft 56, all as is clearly illustrated in FIG. 4. More particularly, as illustrated in FIG. 4, in order for the mobile unit 10 to properly partake of movement either in an ascending or descending relation to the cargo ramp 58, the rear wheels, as exemplified by rear wheel 52, must be urged into the illustrated clearance position in which they are extended the distance 60 beyond that of the front wheels 46, 48 and thus, effectively maintain a horizontal orientation in the mobile unit 10. In this connection, it should be readily appreciated that the referred to horizontal orientation is necessary during loading, even of an empty mobile unit 10, in order to prevent breakage and shifting in position of the medical equipment and supplies therein and, during unloading from the aircraft 56 with any surviving victims, the horizontal orientation in the unit 10 is of course, an absolute necessity in order to prevent any further injury to the survivors.

The essence of the within invention is to provide hydraulically-operated wheels 50, 52 having the dual rotational and extending modes as just noted, the same being the result of a well understood operative connection between each of the wheels 50, 52 and a cooperating hydraulic motor 54 for each wheel. While the aforesaid should be well understood and need not be described in detail, it is nevertheless mentioned for completeness' sake that an appropriate hydraulic means for extending or retracting telescoping cylinders in interposed position between said wheels 50, 52 and the motors 54 may consist of the hydraulic means described and illustrated in U.S. Pat. No. 3,743,044, which by this reference is incorporated herein in its entirety. It is also to be noted that the appropriate controls for operating the hydraulic means just referred to are also well understood and may be any one of several such commercially available controls as illustrated and described, for example, in U.S. Pat. Nos. 3,183,016 and 3,254,738.

Figure 2:
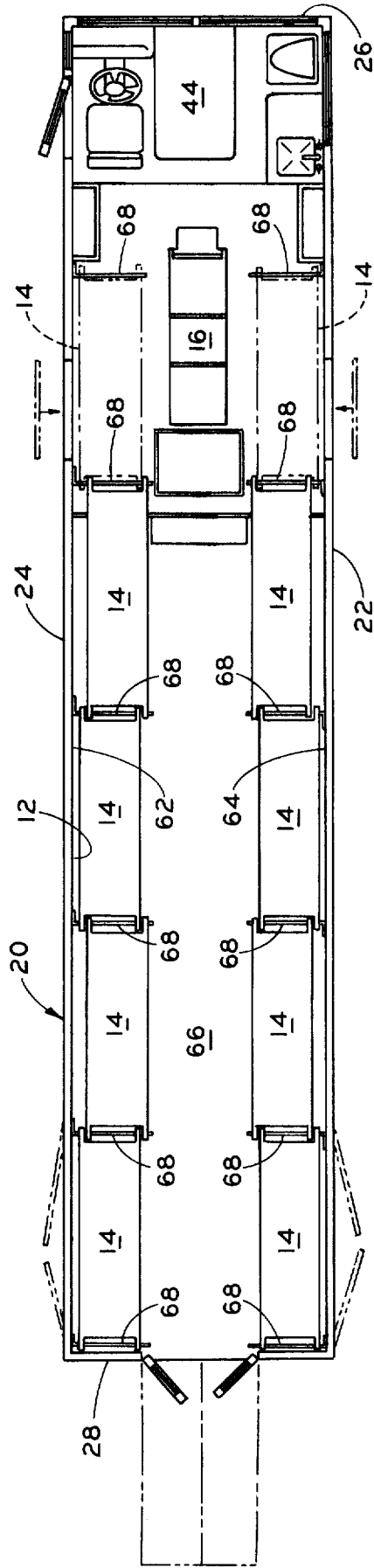
FIG. 2 is a plan view of the unit with the top removed to better illustrate internal structure features thereof.

As is perhaps best illustrated in the plan view of FIG. 2, not only does the standard cargo container 20 provide an appropriate area for storage of medical facilities and equipment, but the rectangular shape thereof advantageously presents an elongated rectangular pair of opposite walls 62 and 64 for supporting the stretcher beds 14 which of course, are essential for proper movement of the injured survivors into and out of the mobile unit 10 in the course of providing emergency treatment to such survivors. That is, the shape and size of the container 20 readily contributes to providing a central passage way 66 for movement of the attending medical personnel as well as injured survivors within the hospital area 12, while extending laterally of the walls 62 and 64 are spaced apart wall-attached brackets, individually and collectively designated 68, which effectively support the stretcher beds 14 in spanning relation therebetween.

In summary, it should be readily appreciated that there has been described herein a noteworthy mobile hospital 10, which utilizes to advantage the capability afforded it by having a body formed of a standard cargo container 20 to be readily transportable to the immediate vicinity of a disaster site and at such site, to thereafter have surface transportability to an immediate adjacent location to the surviving victims by virtue of its embodied four-wheel drive represented by the internal combustion engine-operated front wheels 46, 48 and the independently operated hydraulically powered wheels 50 and 52, the referred to four-wheel drive being capable of providing an anticipated maximum speed of 55 miles per hour.

A latitude of modification, change and substitution is intended in the foregoing disclosure, and in some instances some features of the invention will be employed without a corresponding use of other features. Accordingly, it is appropriate that the appended claims be construed broadly and in a manner consistent with the spirit and scope of the invention herein.

What is claimed is:

1. An emergency hospital unit adapted for transportation to, and use at, a site of a major disaster preparatory to providing emergency medical treatment to injured survivors thereat, said unit being comprised of a standard cargo container of the type capable of airlift transportation to a selected location in the immediate vicinity of said disaster site and bounding an internal area of approximately eight feet in width, eight feet in height and forty feet in length for storage of medical equipment and facilities, and a four-wheel drive operatively embodied in the aforesaid container adapted to provide surface transportability thereto for movement of said container from said selected location to said injured survivors, said four-wheel drive consisting of an internal combustion engine-operated pair of wheels located adjacent the front of said container, and in locations adjacent the rear of said container and on each of the opposite sides thereof a cooperating operative arrangement of a wheel and of a hydraulic motor, said hydraulic motor being selectively operable to urge said rear wheels from a retracted position through descending movement to maintain a horizontal orientation in said container during which only said front wheels are powered in rotation by said internal combustion engine to cause movement in said container, and in said retracted position of said wheels, said hydraulic motor being operable to power in rotation said rear wheels such that in conjunction with said internal engine-operated front wheels said rear wheels also contribute to producing movement in said container, whereby said container has a four-wheel drive for facilitated movement at said disaster site and a front drive wheel drive and a horizontal orientation during the loading and unloading thereof in relation to an inclined loading ramp incident to the airlift transportation thereof.

2. An emergency hospital unit of the mobile type as defined in claim 1, wherein said container is rectangular in shape and said internal combustion engine for said front pair of wheels is housed internally in a delineated front area thereof so as to minimize any adverse affect of said engine during the loading and unloading of said container incident to the transporting thereof.

3. An emergency hospital unit of the mobile type as defined in claim 2, wherein the interior opposite side walls of said container serve as support for said medical equipment and facilities and an access path is left therebetween lengthwise and centrally of said container for the movement of personnel.

4. An emergency hospital unit of the mobile type as defined in claim 3, wherein said medical facilities include spaced apart brackets extending laterally of said side walls and stretchers disposed in spanning relation between said brackets.

* * * * *